July 7, 1959 J. P. BRUCK 2,893,176
POWER SURFACING MEANS
Filed April 24, 1958 2 Sheets-Sheet 1
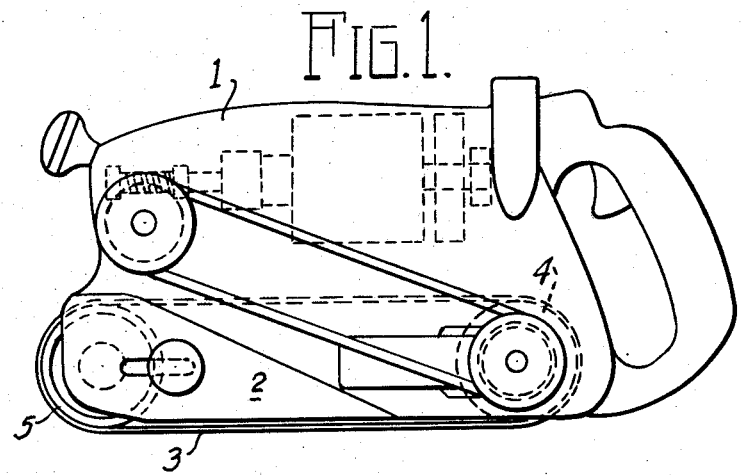
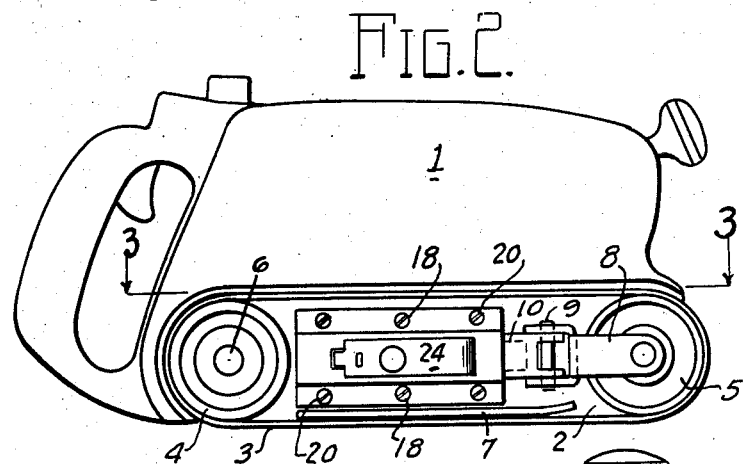
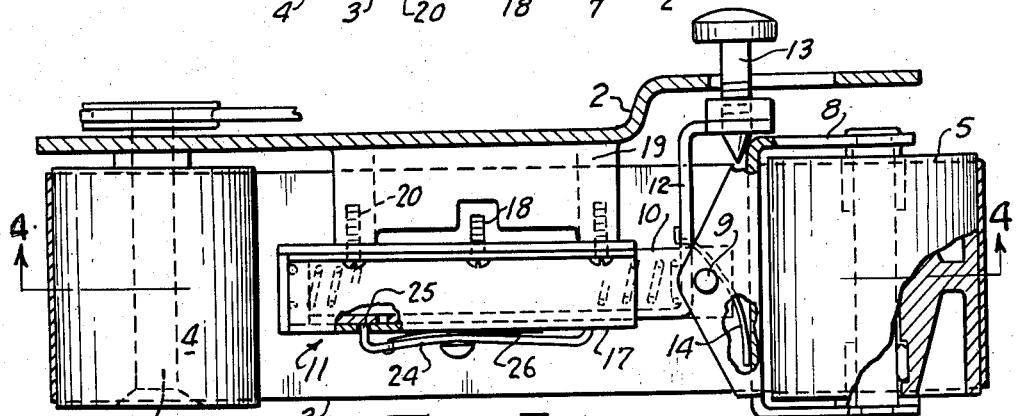
INVENTOR.
John P. Bruck
BY Owen & Owen
ATTORNEYS July 7, 1959  J. P. BRUCK  2,893,176
POWER SURFACING MEANS
Filed April 24, 1958  2 Sheets-Sheet 2
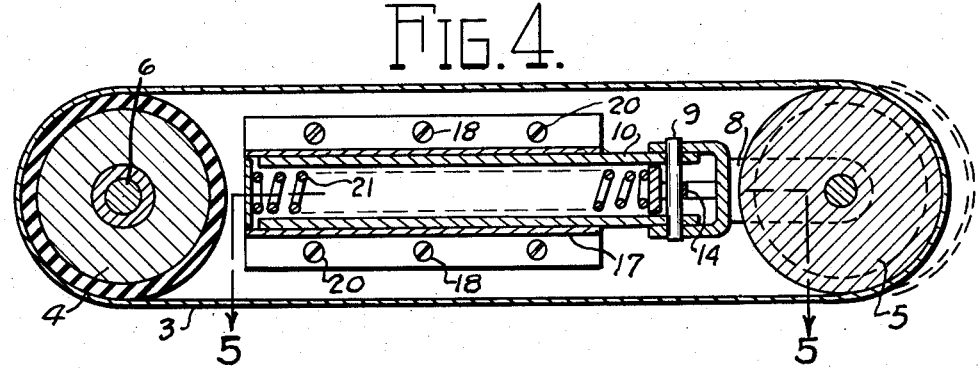
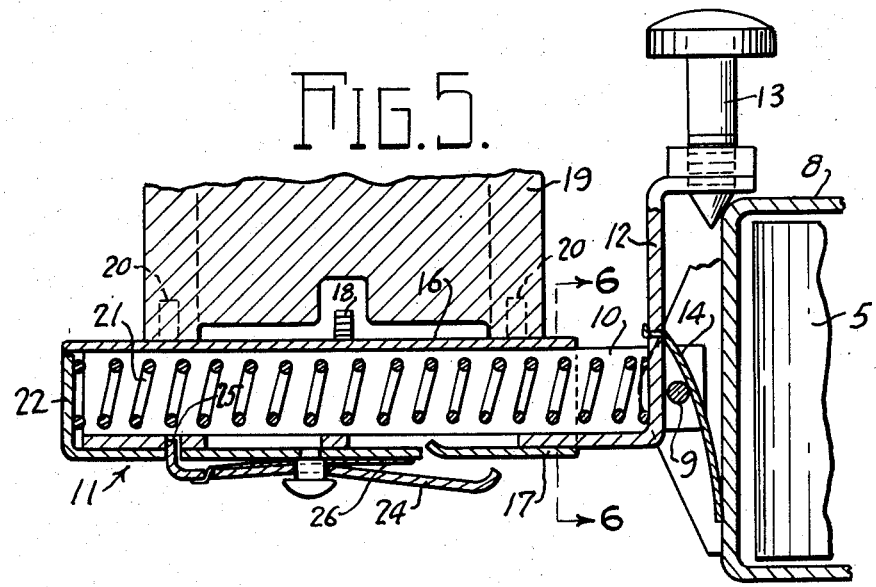
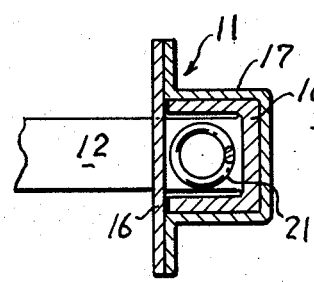
INVENTOR.
John P. Bruck
BY Owen & Owen
ATTORNEYS

2,893,176
POWER SURFACING MEANS

John P. Bruck, Toledo, Ohio, assignor to American-Lincoln Corporation, Toledo, Ohio, a corporation of Ohio Application April 24, 1958, Serial No. 730,617

1 Claim. (Cl. 51—170)

This invention relates particularly to portable hand sanding and abrading machines referred to generally in the trade as bench type sanderplanes.

The primary object of the invention is the provision in a machine of this character of improved tensioning means for the abrading belt including novel means for holding the tensioning means in tension released position with the belt guiding rolls in relatively retracted relation to facilitate easy and quick removal from or replacement of a belt thereon.

Further objects and advantages of the invention will be apparent from the following detailed description and from the accompanying drawings illustrating one embodiment of the invention, and in which:

Figs. 1 and 2 are different side views of the machine;

Fig. 3 is an enlarged plan view of the roll mounting and spacing means, with parts in section;

Fig. 4 is a section on the line 4—4 in Fig. 3;

Fig. 5 is an enlarged detailed section on the line 5—5 in Fig. 4, with the idler roll in retracted position relative to the other roll (not shown), and Fig. 6 is an enlarged cross section on the line 6—6 in Fig. 5.

Referring to the drawings, 1 designates a sanderplane housing having at one side a dependent bottom flange 2 forming one side of a bottom space in which the customary sanding belt 3 and its guide rolls 4 and 5 are positioned. The drive roll 4 is suitably driven from a motor in the housing 1 and has its carrying shaft 6 journaled adjacent to one end in a suitable bearing in the flange 2. The customary pressure plate 7 for the lower run of the belt is carried by the side flange 2 above such run.

The idler roll 5 is mounted in the fork of a U-shaped yoke 8 and the cross or loop member of the yoke is pivotally connected centrally of its ends by a pivot pin 9 to the guide stem 10 projecting toward the other roll and into a guide member 11.

The stem 10 is channel-form in cross section with its bottom or connecting web parallel to the pivot pin axis and provided at its pivot end with an extension forming a laterally projecting arm 12 extending through and beyond the channel of the stem. The outer end of this arm is angled toward the yoke 8 and carries an adjusting screw 13. The axis of this screw is transverse to that of the pin 9 and its inner end is conical and coacts with the adjacent corner edge of the yoke 8 to adjust it in one direction on its pivot against the tension of a spring 14. This spring, in the present instance, is of bar-form, with one end anchored in the arm 12, and extends over the pivot pin 9 and bears under tension against the cross member of the yoke to yieldingly hold it in contact with the adjusting screw.

The guide member 11 comprises a base plate 16 and a channel member 17 with the free edges of the side walls of the latter outwardly flanged and secured to the base plate by assembly screws 18. The guide member 11 is mounted on a frame part 19 by screws 20 projected through the flanged edges of the channel member 17 and base plate 16 and into said part.

A coiled expansion spring 21 is mounted in the channel of the stem 10 with one end bearing against the arm 12 and its other end bearing under tension against the closed end 22 of the channel 17, thus normally acting to force the yoke 8 and its roll 5 outwardly to maintain the belt under desired working tension.

Preparatory to mounting the belt on or removing it from the rolls, the yoke 8 with its roll is pressed inward against the tension of the spring 21 and held in such position until the operation is completed. To facilitate holding the yoke in its retracted position during a belt mounting or removal operation, the channel member 17 of the guide unit 11 is provided on its outer or crown side with a latch lever 24 extending lengthwise thereof and having a tongue at one end projecting laterally through an aperture in the member 17 and normally into an aperture 25 in the registering portion of the stem 10. The latch lever is fulcrumed to the member 17 and acted on by a spring 26 to normally influence its engagement within the aperture as shown in Fig. 5.

I wish it understood that my invention is not limited to any specific construction, arrangement or form of the parts, as it is capable of numerous modifications and changes without departing from the spirit of the claim.

What I claim is:

In a surface abrading machine having a frame, a power driven roll and an idler roll spaced parallel thereto, a yoke carried by the idler roll, a sanding belt connected and guided by said rolls, a stem projecting from said yoke towards the power roll, said stem being connected to the yoke by a pivotal connection, the stem being in channel form and having an arm projecting at right angles thereto, a guide mounted on the machine frame and surrounding said stem, a compression spring in said stem compressed between the ends of the guide and the right angle projection on the stem, a catch lever mounted on the outside of the guide and having an end portion thereof penetrating said guide, a notch in the stem and a spring urging said catch lever into the notch in the stem.

References Cited in the file of this patent

UNITED STATES PATENTS

| | | |
|---|---|---|
| 1,821,624 | Emmons | Sept. 1, 1931 |
| 1,841,787 | Carter | Jan. 19, 1932 |
| 1,969,318 | Myers | Aug. 7, 1934 |
| 2,069,502 | Myers | Feb. 2, 1937 |
| 2,722,091 | Dolan et al. | Nov. 1, 1955 |